June 5, 1934.  E. M. KRUEGER  1,961,498
STRAINER TRAP
Filed Jan. 31, 1931
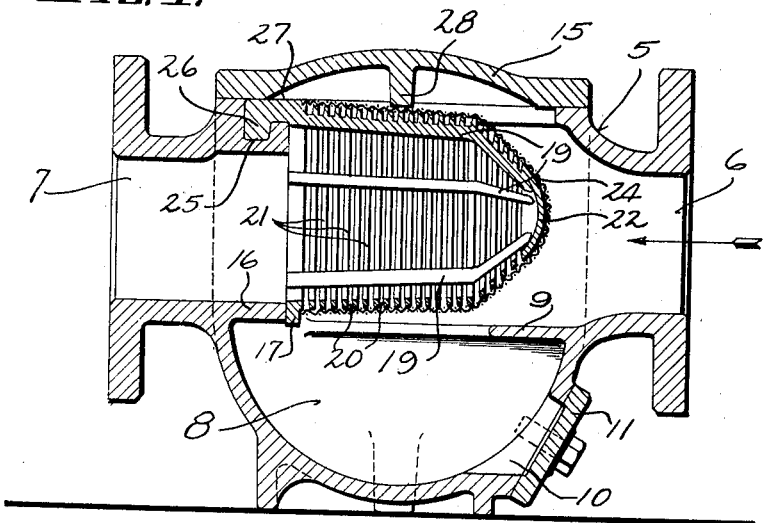
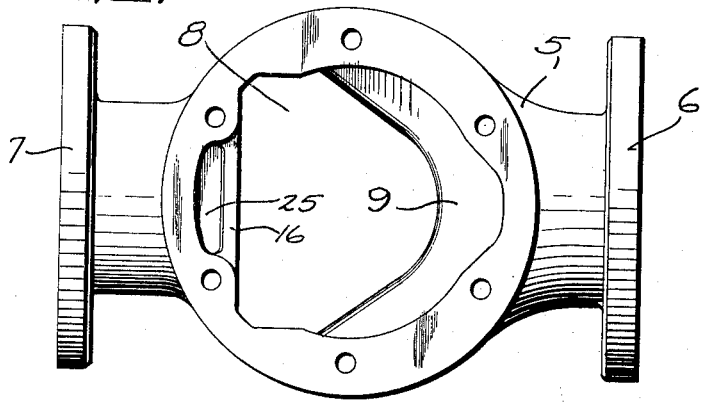
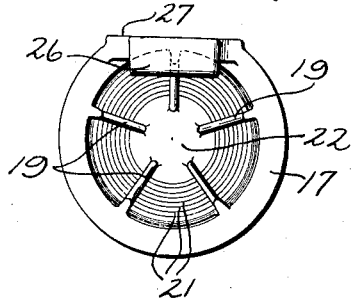 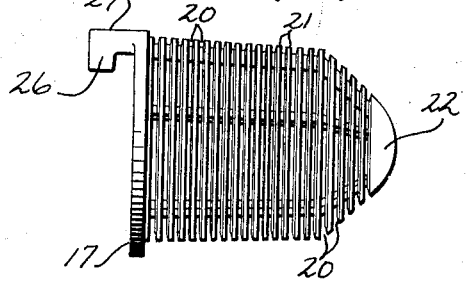
Inventor
Emil M. Krueger
By Wheeler, Wheeler & Wheeler
Attorneys Patented June 5, 1934

1,961,498

UNITED STATES PATENT OFFICE 1,961,498

STRAINER TRAP

Emil M. Krueger, Milwaukee, Wis., assignor to Badger Meter Manufacturing Company, Milwaukee, Wis., a corporation of Wisconsin Application January 31, 1931, Serial No. 512,519

6 Claims. (Cl. 210—165)

This invention relates to improvements in strainer traps.

It is an object of the invention to provide a novel and effective device of large capacity, in proportion to its overall dimensions, which may be used in a liquid supply line either independently or as a support for a fine mesh wire screen for the straining of liquid passing through the line.

The device is particularly important when used to support a fine mesh wire strainer. In order to avoid breakage, damage or clogging due to distortion of a fine wire mesh screen, it is necessary to provide adequate support therefor. A device embodying the present invention has smooth surfaces exceptionally well suited for this purpose.

A further object of the invention relates to the trap in which the strainer is located and the provision of means whereby the trap and strainer interact in such a way as to fix the position of the strainer when the trap is closed and yet to leave the strainer freely removable and completely expose the interior of the trap when the cover of the trap is removed.

In the drawing:

Figure 1 is a vertical axial section through a strainer trap embodying this invention.

Figure 2 is a plan view of the trap as it appears with the cover and strainer removed.

Figure 3 is an end elevation of the strainer.

Figure 4 is a side elevation of the strainer.

Like parts are identified by the same reference characters throughout the several views.

The trap comprises a casing 5 having a flanged inlet portion 6 and a corresponding outlet portion 7. Below the direct path of fluid between the inlet and outlet portions of the trap is a settling chamber 8 which is protected to a considerable degree from turbulence occasioned by the flow of fluid through the device by means of an integral plate 9 which extends above chamber 8 in fairly close proximity to the sides and bottom of the strainer hereinafter to be described.

A drainage opening at 10 in the settling chamber is provided with a closure 11. More complete access to the entire device is had by means of a cover 15 substantially coextensive with the top of casing 5.

Projecting into the interior of casing 5 approximately coaxial with one of the ports thereof is an integral sleeve 16 which is abutted by the annulus 17 at the rear of the strainer. The strainer is of unitary construction and is made by casting a deeply cupped body with internal ribs at 19 and subsequently cutting annular grooves 20 completely through the body at axially spaced intervals so that the completed strainer comprises a series of axially spaced rings 21 and an imperforate nose or front piece 22 held to the annulus 17 by means of the ribs 19 aforesaid. The corresponding marginal portions of the successive rings lie in a straight line in an axial direction at any given point as clearly shown in Figures 1 and 4. Thus they provide a relatively large bearing surface and substantially continuous support for the wire gauze screen 24 as compared with any strainer made up of wire with openings of equal capacity.

In order that the strainer may be securely fixed in position and yet may be instantly removable, I recess the sleeve 16 at 25 and provide at 26 on the strainer a lug engageable in the recess and having an upper surface 27 formed to be abutted by the cover 15. A boss 28 on the cover rests upon the top of the strainer and strainer screen at an intermediate point to maintain the strainer annulus 17 tightly seating against the end of sleeve 16. It will be obvious that when the cover 15 is in place the strainer will be immovably fixed within casing 5, whereas if cover 15 be removed there is nothing whatever to prevent the strainer from being lifted directly from the casing.

The slots 20 in the strainer are all radial in direction and are of sufficient depth so that even adjacent the nose 22 of the strainer there is no tendency for the fluid to pass directly through any slot. Since the fluid must change its course substantially at right angles in order to traverse the strainer, there is substantially no tendency for foreign matter to be driven by impact or velocity of the fluid through the strainer or the gauze screen carried thereby. On the contrary, the area provided for straining in the device herein disclosed is so large in proportion to the capacity of the trap as a whole that the fluid will pass through the trap at comparatively low velocity and with comparatively little resistance.

I claim:

1. In a strainer trap the combination with a casing having an aperture a closure therefor, and a strainer seat, of a strainer removably fitted to said seat and provided at its top with a hook in interlocking engagement with said casing and abutted by said closure in a direction to maintain said engagement pending removal of the closure.

2. In a strainer trap, the combination with a casing having a strainer seat, a recess adjacent the strainer seat and an opening above said recess, of a strainer having a base portion complementary to said seat, and a hook portion extending from the top of the strainer downwardly into said recess and a closure for the opening in said casing engaging the hooked portion of said strainer and adapted thereby to maintain said hook within the recess.

3. In a strainer trap, the combination with a casing having a strainer seat, a recess adjacent the strainer seat and an opening above said recess, of a strainer having a base portion complementary to said seat, and a hook portion extending into said recess and a closure for the opening in said casing engaging the hooked portion of said strainer and adapted thereby to maintain said hook within the recess, said closure having a boss engaging a part of said strainer remote from said hook in a direction to maintain said strainer on its seat.

4. In a device of the character described, a casing provided with inlet and outlet ports and an intermediate chamber, a sleeve projecting into said chamber, and a strainer positioned within the chamber and removably interlocked with the outside of said sleeve, said casing including a removable closure cap abutting said strainer in a direction adapted removably to maintain its engagement with said sleeve.

5. In a device of the character described, the combination with a ported casing having an intermediate settling chamber, of a strainer enclosing a port of said casing and projecting across said settling chamber axially in alignment with the ports of said casing, and a plate positioned longitudinally of said casing and below said strainer in spaced relation thereto and partially enclosing said settling chamber, whereby to protect the contents of said chamber from turbulence of fluid entering the casing, said strainer being positioned directly above the inclosed portion of said chamber, whereby material collected by the strainer will fall into said settling chamber.

6. In a device of the character described, a strainer comprising axially spaced rings having flat faces and narrow slots therebetween, means for supporting said rings, and a fine gauze screen carried thereon.

EMIL M. KRUEGER.